(12) United States Patent
Townsend

(10) Patent No.: US 6,283,528 B1
(45) Date of Patent: Sep. 4, 2001

(54) FOLDING MOTOR VEHICLE ENTRY SEAT FOR PERSONS WHO USE WHEELCHAIRS AND OTHERS WHO HAVE PHYSICAL LIMITATIONS

(76) Inventor: Steven J. Townsend, 869 E. Ramona Ave., Salt Lake City, UT (US) 84105

( * ) Notice: Subject to any disclaimer, the term of this patent is extended or adjusted under 35 U.S.C. 154(b) by 0 days.

(21) Appl. No.: 09/525,838

(22) Filed: Mar. 15, 2000

Related U.S. Application Data

(63) Continuation-in-part of application No. 09/358,441, filed on Jul. 21, 1999.

(51) Int. Cl.$^7$ ........................................................ B60N 2/00

(52) U.S. Cl. ..................... 296/65.01; 296/65.03

(58) Field of Search .............................. 296/65.01, 65.03, 296/65.04

(56) References Cited

U.S. PATENT DOCUMENTS 3,469,880 * 9/1969 Woodward .
5,435,614 * 7/1995 Norberg .............................. 296/65.1

OTHER PUBLICATIONS

Braun Companion Seat Jan. 1996.
EZ Rizer Seat Lift System by Bruno Jan. 1996.
Vertical Pow'r–Seat Base by Bruno Jan. 1994.

* cited by examiner

Primary Examiner—D. Glenn Dayoan
Assistant Examiner—Jason Morrow
(74) Attorney, Agent, or Firm—Mallinckrodt & Mallinckrodt; Brian R. Rayve

(57) ABSTRACT

A folding seat for assisting persons who use wheelchairs and other persons with physical limitations to enter and exit motor vehicles. The seat includes an adjustable width frame which fits adjacent a vehicle seat at a doorway of the vehicle and which attaches to the existing bracketry holding the vehicle seat to the vehicle body. A transfer seat is pivotally connected longitudinal of the vehicle and vertically slidably connected at an edge thereof to respective slots in a pair of spaced apart upright posts of the frame. The seat is supported in a horizontal deployed position with the pivotal connection thereof at the top of the respective slots by means of an upper cross member of the frame and by a folding brace member which extends from the underside of the seat to the lower doorway portion of the vehicle body. The seat includes a stowed position wherein the seat is tilted to a vertical position and lowered such that the pivotal connections are at the lower end of the respective slots, the seat being retained laterally between the upper cross member and the side of the vehicle seat.

23 Claims, 7 Drawing Sheets

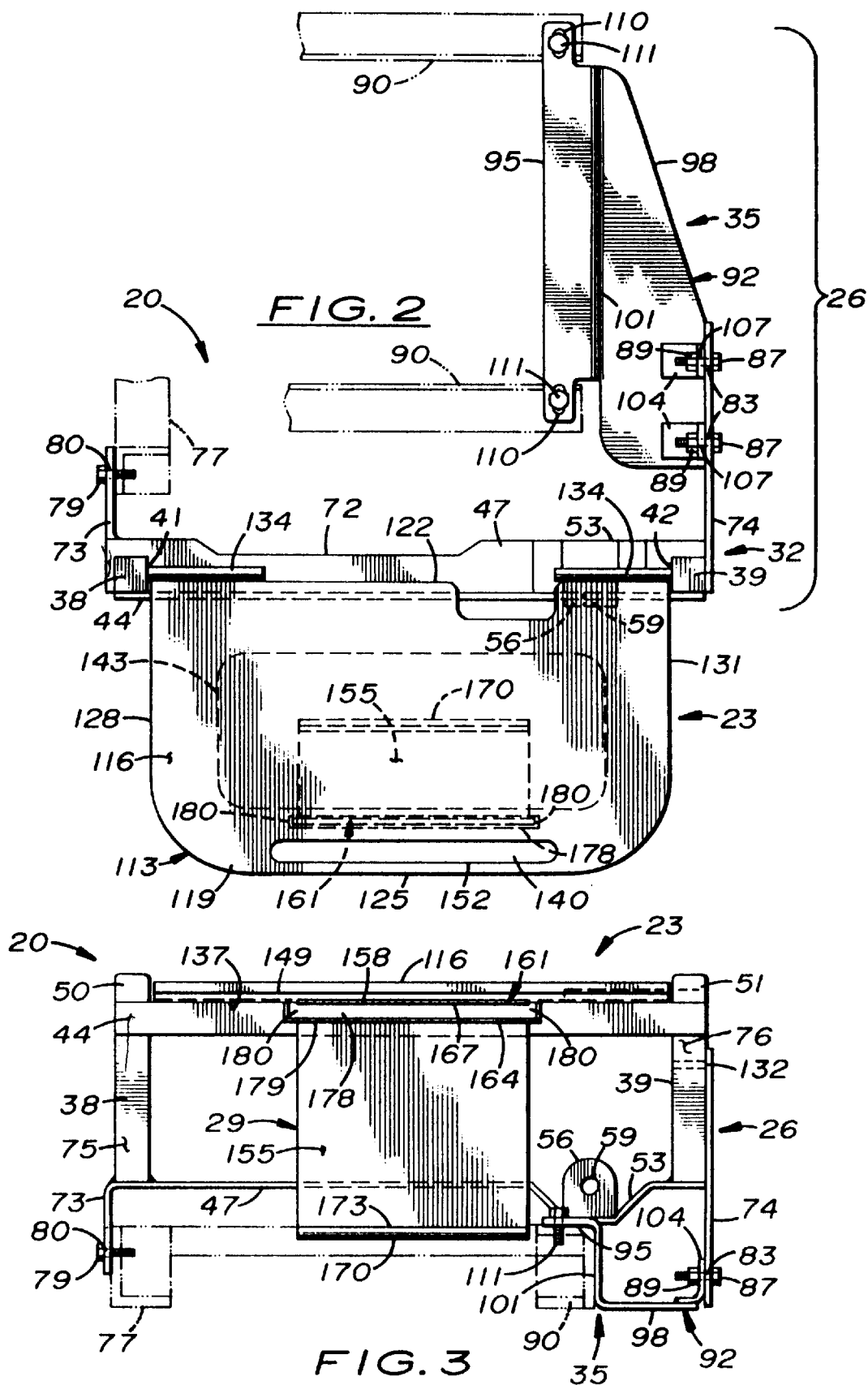

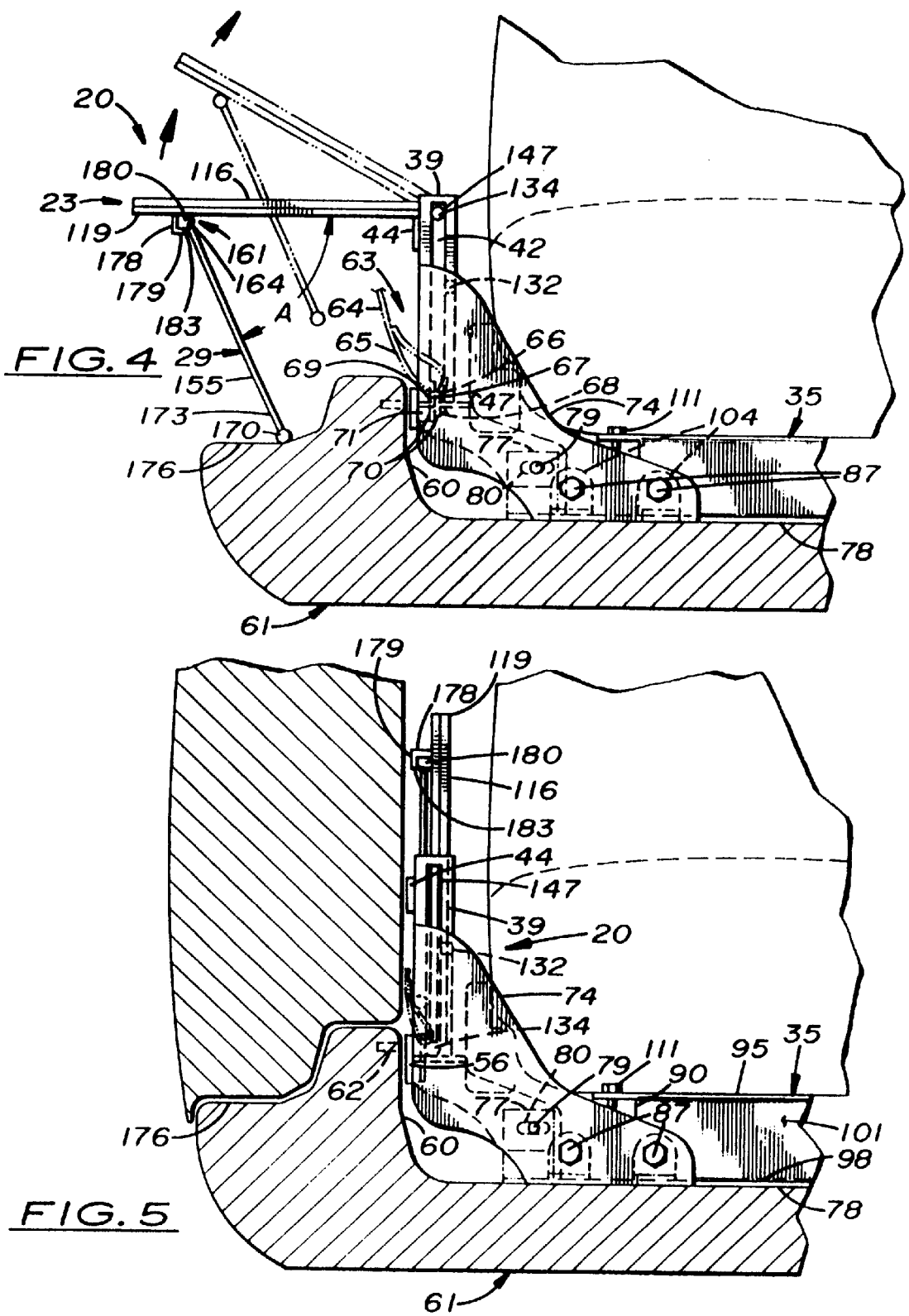

Figure 1:
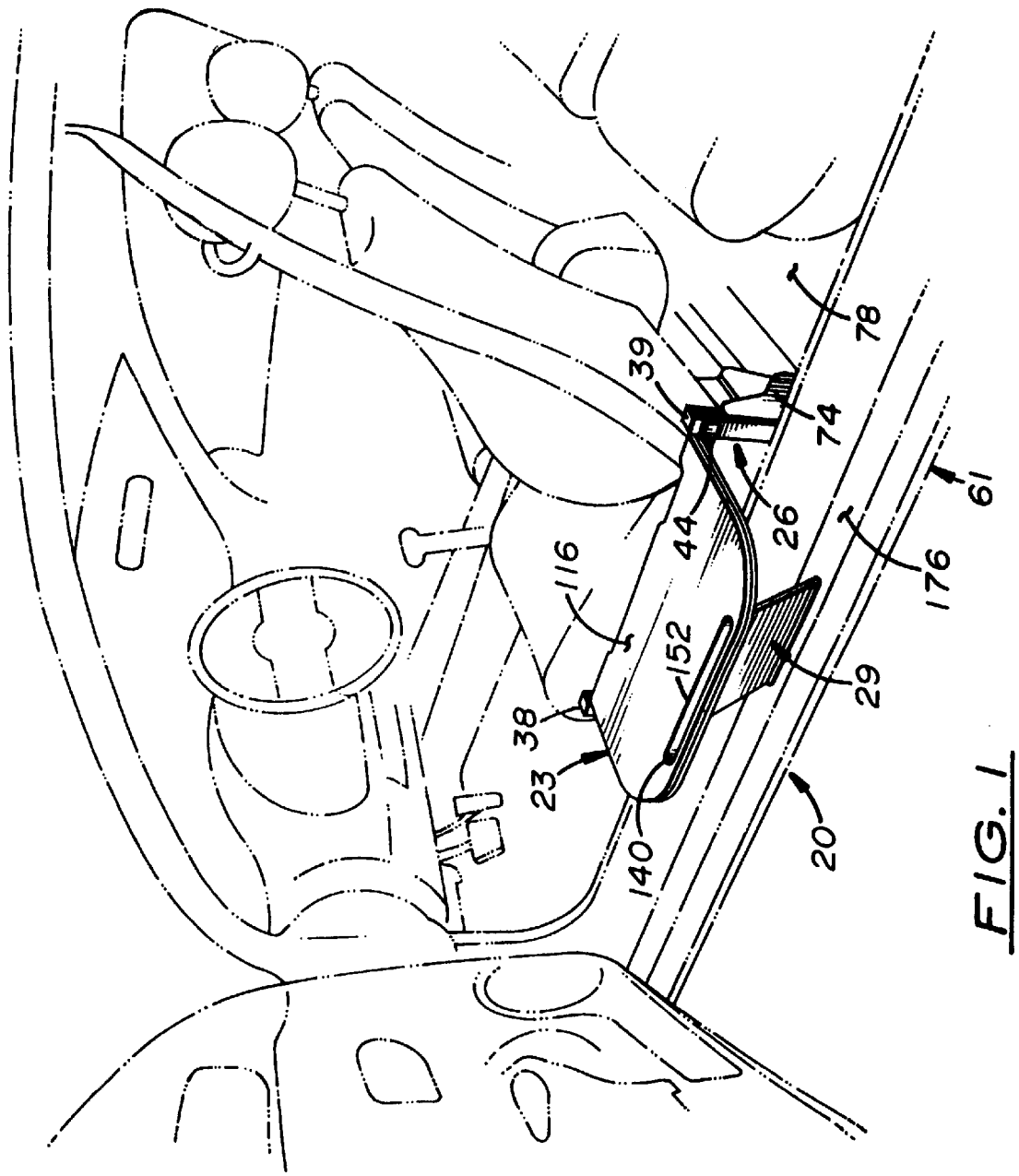

FOLDING MOTOR VEHICLE ENTRY SEAT FOR PERSONS WHO USE WHEELCHAIRS AND OTHERS WHO HAVE PHYSICAL LIMITATIONS

RELATED APPLICATION

This application is a continuation-in-part of my co-pending U.S. application Ser. No. 09/358,441 filed Jul. 21, 1999.

BACKGROUND OF THE INVENTION

1. Field

The invention is in the field of devices for assisting persons who have difficulty entering and exiting motor vehicles due to the use of a wheelchair or otherwise due to their physical limitations, and more specifically to vehicle access devices that mount within the space between the door and seat of such motor vehicles.

2. State of the Art

Various devices are available for assisting handicapped persons who utilize wheelchairs to enter and exit motor vehicles. For example, specially modified vans having elevator lifts mounted in the doorway thereof have been used for years. Such lifts typically include a ramp upon which the entire wheelchair with person is wheeled which lifts by means of a pair of hydraulic cylinders mounted at opposite sides thereof and to the outer frame of the doorway. The hydraulic power to operate the hydraulic cylinders comes from a hydraulic pump mounted to the vehicle engine. Such a lift system requires modification to the motor vehicle and only fits on certain model of vans. Likewise, specially modified commercial buses are built with hydraulic lifts in the front doorway thereof with similar disadvantages to the van. Such specially modified vans and particularly buses are obviously not affordable by most individuals.

Regarding modified private automobiles and vans for wheelchair access, there is a powered base which replaces the standard fixed base in full-sized Ford cars made by the Braun Corporation of Winamac, Ind. Such power base allows the front driver or passenger seat to pivot sideways and tilt downwardly such that the front edge thereof is at about the height of a wheelchair positioned adjacent to the vehicle so as to facilitate transfer therebetween. Once such transfer from the wheelchair to the car seat has been made, the power base lifts and pivots the occupant into a standard position in such car. Such system requires modifications to the vehicle, costs approximately $3,000, and only fits certain car models.

The Bruno Corporation of Oconomowoc, Wis. manufactures a powered base for use in full-sized pick-up trucks which lowers the driver or passenger from his seat by about six and one half inches from the standard position so as to facilitate transfer to and from a wheelchair therebeside. Such powered base does not allow the seat to pivot, costs approximately $2,500, and requires modifications to the vehicle.

The Bruno Corporation also manufacturers a folding seat lift system for use with full size vans and pickup trucks. Such lift system includes a pair of lift towers which install to the floor of the vehicle adjacent the outside edge of the driver's side seat. A lift bar spans between the respective towers with a pivotally attached seat which has a horizontal position extending out the vehicle doorway with the door open and a vertical position for stowage during driving with the vehicle door closed. A folding L-shaped armrest and safety bar attached to one of the towers aids in maintaining the occupant in the seat during use. This lift system presumably uses electric screw or hydraulic type lifting. Such lift system is also relatively expensive.

There is a need for a low-cost transfer system which can be used particularly in small, energy efficient automobiles and small pickup trucks which requires no modification to such vehicle for installation therein.

SUMMARY OF THE INVENTION

A folding motor vehicle entry seat for facilitating the entry and exit of a person who uses a wheelchair or other persons with physical limitations in entering and exiting a vehicle, such as from a wheelchair positioned adjacent such vehicle to a seat of such motor vehicle and vice-versa. The entry seat is completely manually operated and uses no hydraulic, motor, or other powered assist and can be manufactured to attach to the vehicle using the floor of the vehicle body and/or the existing connections such as the standard vehicle bolts and brackets which attach the vehicle seat and optionally the seat belt to the vehicle body or other such vehicle structure (hereinafter called the vehicle body) without requiring any or only minor modification of the vehicle.

The entry seat comprises a main frame means, which can be of extendible length, end a seat means which is pivotally connected thereto by a pivot means. The main frame means typically comprises a pair of upstanding post means held in a spaced relationship by a cross member means. The main frame means extends generally parallel to and adjacent the side of the vehicle seat, can include portions at front and/or rear ends thereof which extend laterally inwardly thereof, and which uses the vehicle body, the floor of the vehicle body, and/or existing connections to attach to the vehicle. The main frame means includes spaced-apart, vertically operable guide means, typically at least partly formed by the post means, between which the inside edge portion of the seat means is positioned and to which the seat means is pivotally connected by the pivot means. Such pivotal connections can vertically slide along the guide means to move to a deployed position wherein the seat means is at the top portion of the guide means in an outwardly extending, generally horizontal position at about the height of the seating surface of the vehicle seat. The guide means typically comprises respective vertically extending slots into which respective pin portions of the seat means extend so as to slide therealong.

The seat means is supported in the horizontal, deployed position by a seat stop means of the main frame means which contacts the inside edge portion of the seat means and which supports the seat means along with the pivotal connections which contact respective upper ends of the guide means. The seat means folds to a stowed position by grasping and lifting the outside edge portion thereof so as to pivot the seat means about the pivotal connections and to be disengaged from the seat stop means to a vertical position and then vertically lowered along the guide means to a stowed position between the guide means adjacent the outside of the vehicle seat.

The portions at the front and/or rear ends of the main frame means which extend inwardly can comprise separately bolted-on adapter brackets to adapt to particular motor vehicles, such as to bolt directly to the vehicle body, the floor of the body, and/or to one or more existing connections which retain the seats and seat belts of the vehicle to the body thereof. The front and rear adapter brackets typically include respective upper and lower ends, the upper ends of which are removably attachable to the main frame means using a bolt means which extends through respective holes in said main frame, typically one or more of a plurality of holes which extends vertically on the main frame means, for selective attachment of the front and/or rear adapter brackets at a plurality of vertical positions thereon to fit the particular vehicle, and the lower ends which are attachable to the body of the vehicle, typically the floor thereof. The lower portion of the adapter brackets car include respective pairs of generally V-shaped notches at opposite edges thereof interconnected by respective bend lines disposed at an angle to the longitudinal centerline of said adapter bracket, such that the height at which said adapter bracket mounts to the respective post is configurable to the particular motor vehicle by attaching the respective adapter bracket to the respective post at the desired vertical position for the particular motor vehicle and bending the respective lower portion along the respective bend line for proper attachment to the floor of the vehicle.

The seat stop means can further comprise a pivoting brace means which extends from the seat means adjacent the outside edge thereof to the upper surface of the body lower doorway portion of the vehicle for additional support. A brace stop means thereof, typically being adjustable so as to fit various vehicles, positions the brace means at the proper angle to contact the body lower doorway portion of the particular vehicle when the seat means is deployed. The brace means folds generally parallel to the seat means in the stowed position for compact storage thereof.

The main frame means can be of extendible length such as by including cross member means which is of an adjustable length, such as comprising a pair of end cross members affixed to respective post means of the main frame means which are adjustably interconnected by a connecting means, such as a plurality of bolt means comprising pairs of bolts and nuts which engage respective holes of a plurality of longitudinal holes in the respective end cross members. The cross member means can further include a center cross member having a plurality of longitudinal holes which adjustably interconnects the end cross members by the connecting means, such as the plurality of bolt means comprising pairs of bolts and nuts which engage respective holes of the plurality of longitudinal holes in the respective end cross members and the center cross member. In each case, the bolt means can also comprise bolts which extend through clearance holes in a first of the respective cross members and thread into threaded holes in another of the cross members to be joined together.

The seat means is typically connected to such extendible length main frame means by a pivot means comprising an elongate pivot rod which can be cut to the required length to fit the main frame means and having respective opposite ends which extend from opposite sides of the seat means, with the guide means comprising respective vertically extending slots in the main frame means in which the opposite ends of the pivot rod vertically slide. The seat means is retained in the desired position along the pivot rod relative to the main frame means by a retaining means such as comprising a pair of retaining collars which slidably engage the pivot rod at opposite sides of the seat means seat and which are lockable on the pivot rod to longitudinally retain said seat on said pivot rod such as by tightening respective set screws thereof.

THE DRAWINGS

Figure 6:
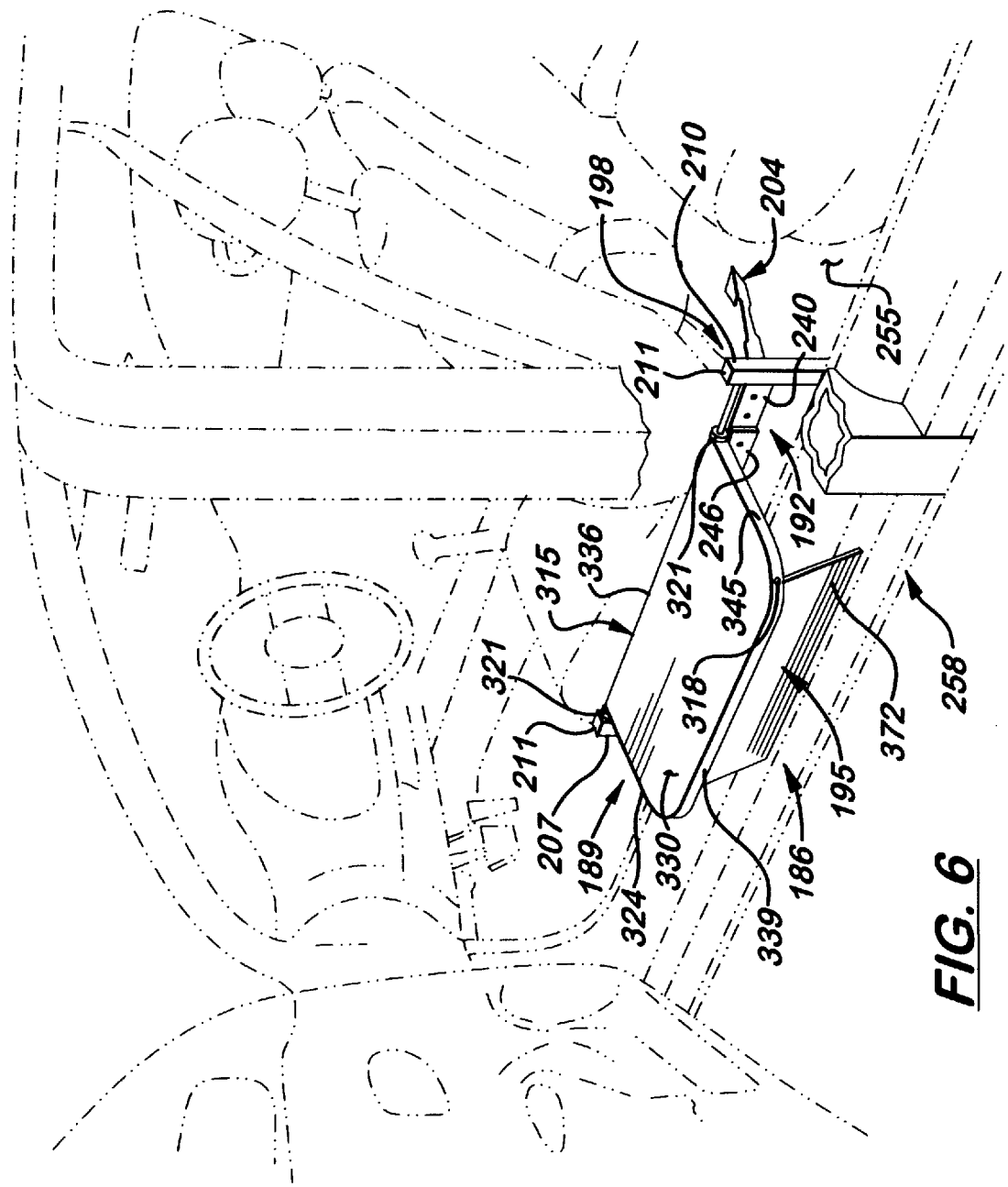
Figure 7:
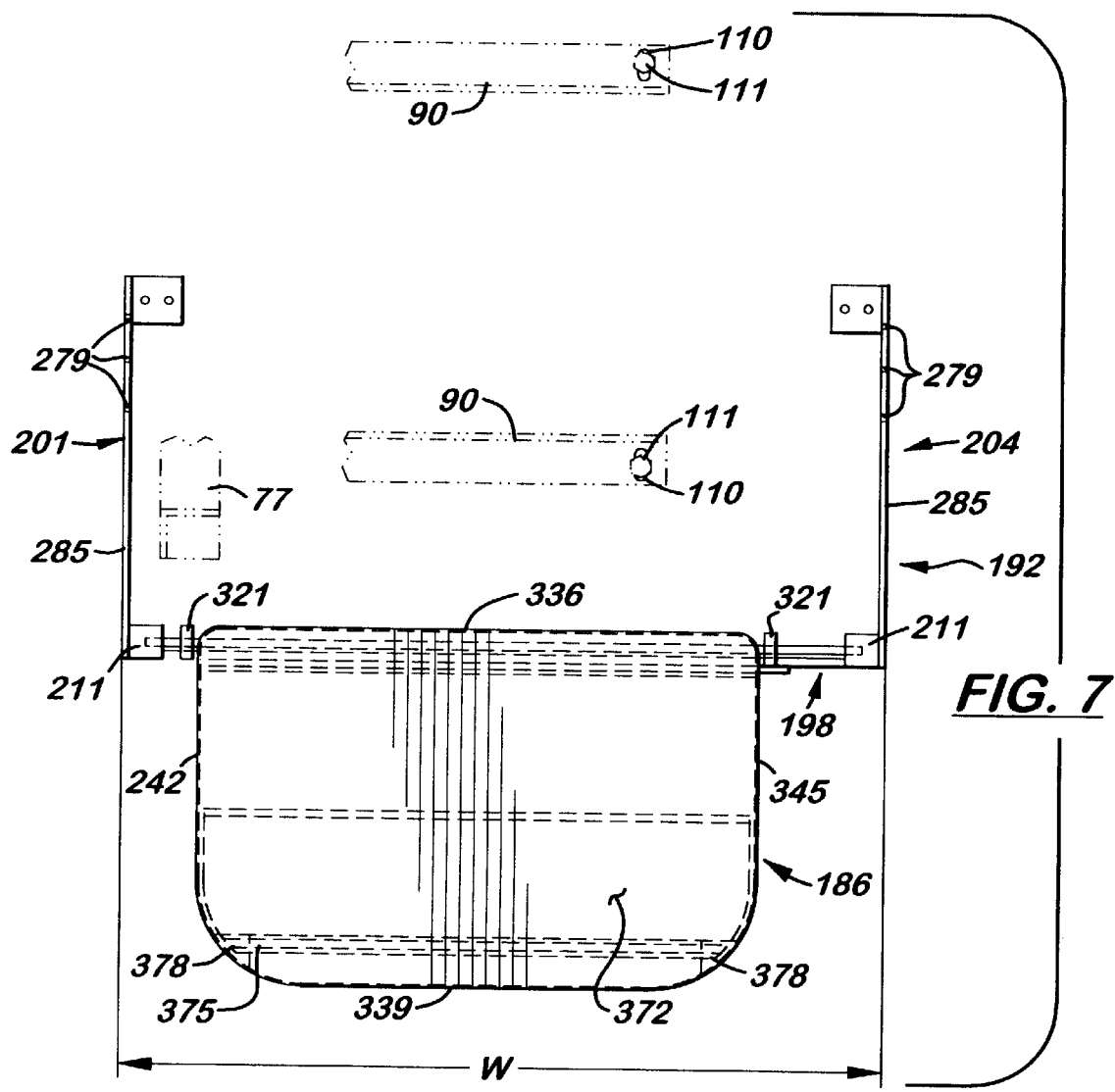
Figure 8:
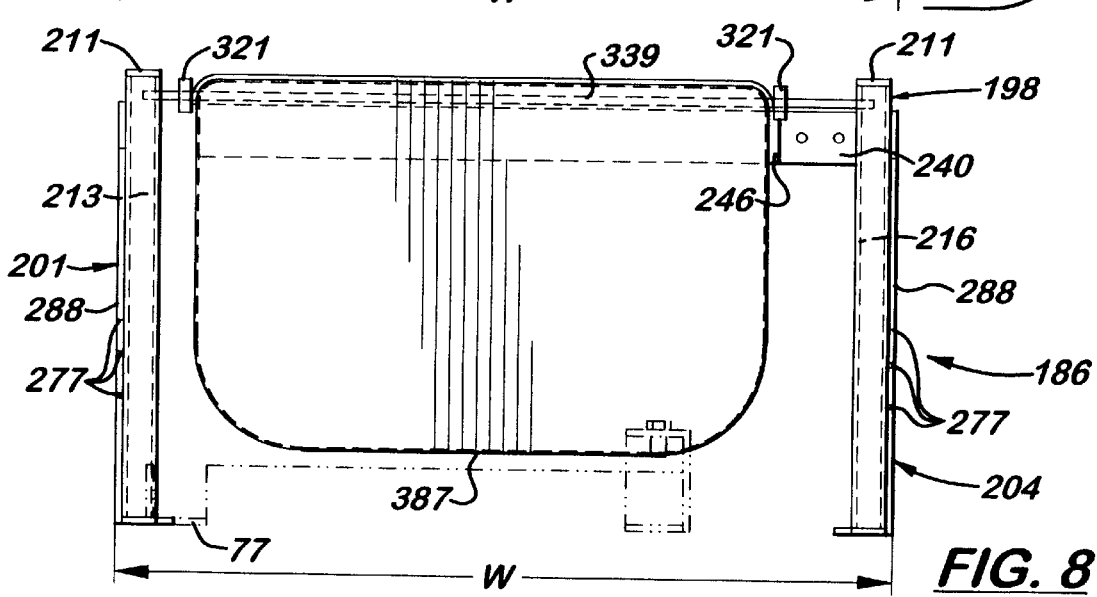
Figure 9:
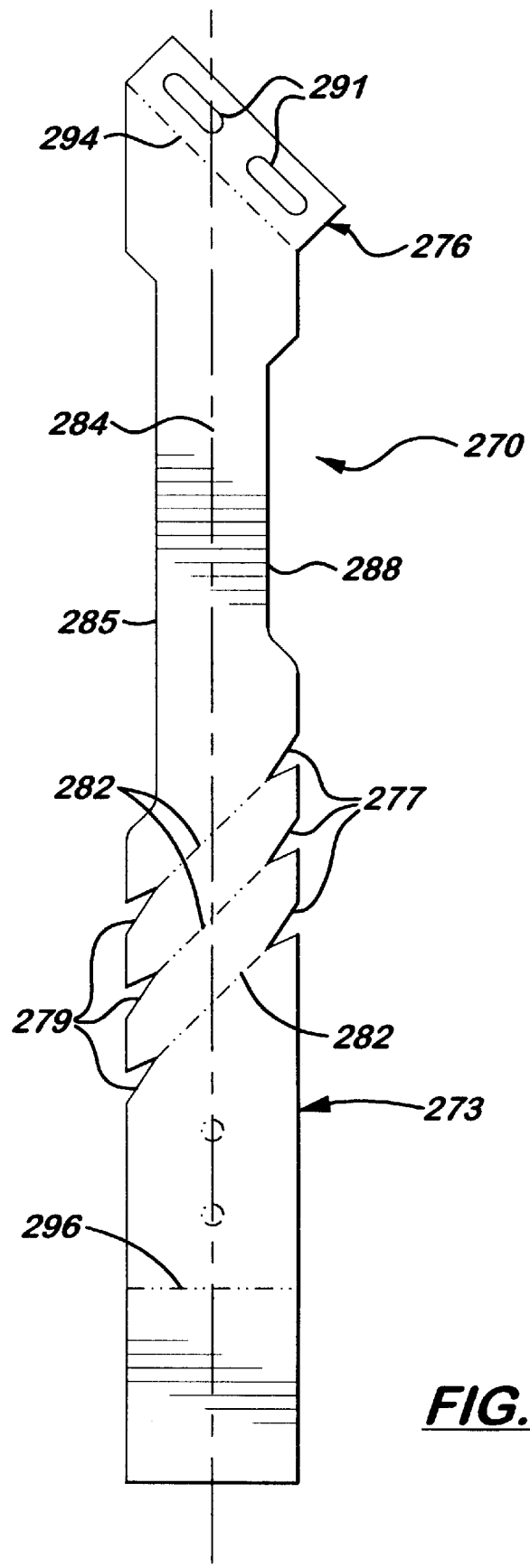
Figure 10:
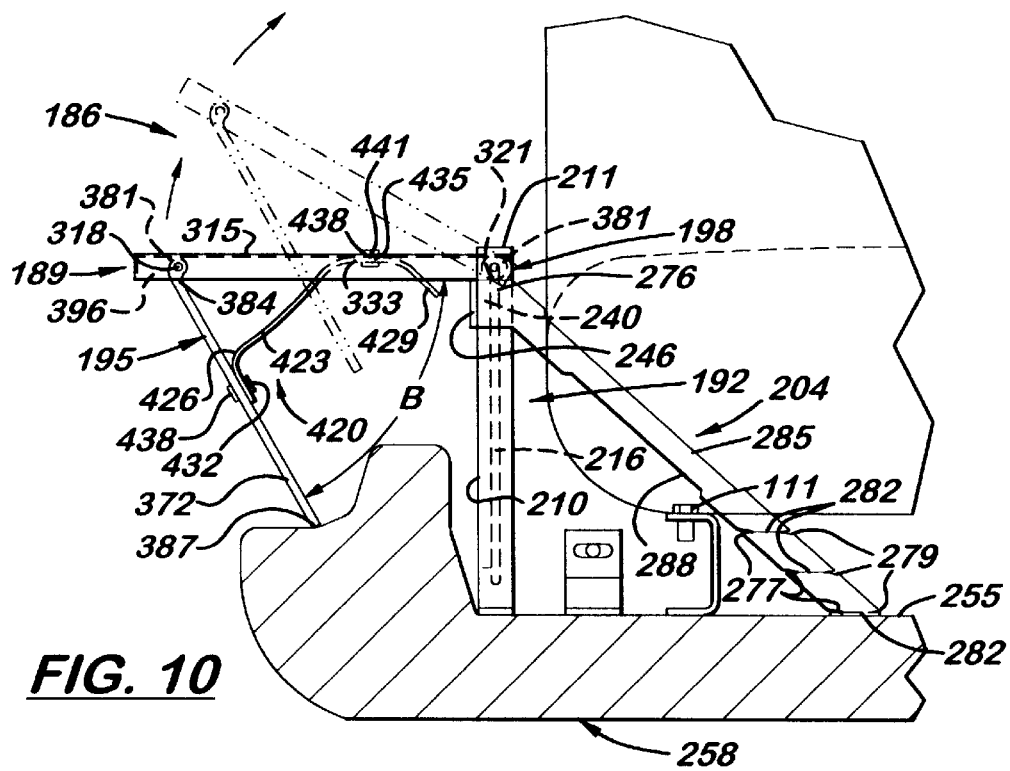
Figure 11:
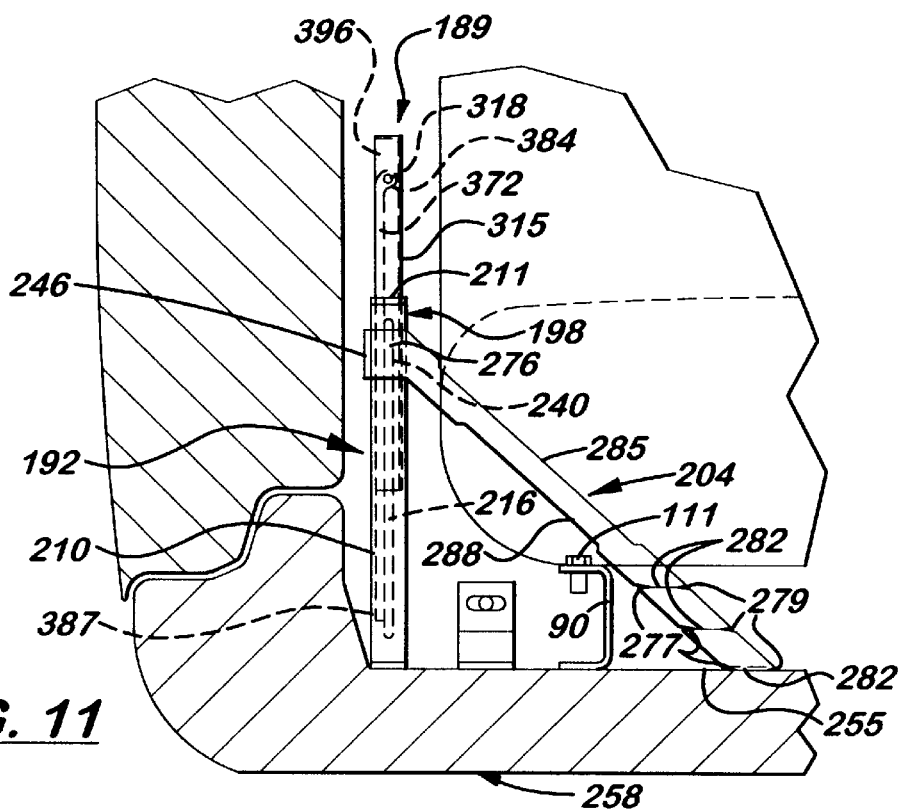

The best mode presently contemplated for carrying out the invention is illustrated in the accompanying drawings, in which:

FIG. 1 is a perspective view of a first embodiment automobile entry seat of the invention in an unfolded position as installed at the doorway of a two door automobile having no "B" pillar;

FIG. 2, a top plan view to an enlarged scale of such first embodiment automobile entry seat in the unfolded position showing the mounting bracketry thereof;

FIG. 3, a side elevational view taken on the line 3—3 of FIG. 2, showing the folding brace which supports the seat in the open position;

FIG. 4, a fragmentary rear end view of such first embodiment automobile entry seat as installed to the seat of the automobile showing how the folding brace of the automobile entry seat rests against the lower doorway portion of the body, the folding motion thereof shown by arrows;

FIG. 5, a fragmentary rear elevational view corresponding to FIG. 4, but wherein such first embodiment automobile entry seat is in a folded position and showing the door of the automobile which is closed;

FIG. 6, a perspective view of such first embodiment automobile entry seat of the invention in an unfolded position as installed at the doorway of a four door automobile having a "B" pillar;

FIG. 7, a top plan view to an enlarged scale of a second embodiment automobile entry seat in the unfolded position showing the mounting bracketry thereof;

FIG. 8, a side elevational view taken on the line 3—3 of FIG. 2, showing the folding brace which supports the seat in the open position;

FIG. 9, a perspective view of a side bracket of such second embodiment automobile entry seat;

FIG. 10, a fragmentary rear end view of such second embodiment automobile entry seat as installed to the seat of the automobile showing how the folding brace of the automobile entry seat rests against the lower doorway portion of the body, the folding motion thereof shown by arrows; and FIG. 11, a fragmentary rear elevational view corresponding to FIG. 4, but wherein such second embodiment automobile entry seat is in a folded position and showing the door of the automobile which is closed.

DETAILED DESCRIPTION OF THE ILLUSTRATED EMBODIMENTS

Referring to FIGS. 1–5, therein is shown a first embodiment folding vehicle entry seat of the invention. Entry seat 20 comprises a seat means in the form of a seat assembly 23 which is pivotally attached by a pivot means to a main frame means in the form of main frame assembly 26 which includes a seat stop means, and the seat stop means which further includes a brace means in the form of a support brace 29.

Main frame assembly 26 comprises a main frame 32 and a bolted-on rear adapter bracket 35. Main frame 32 includes a guide means comprising a pair of upstanding, generally rectangular cross-section posts 38 and 39 having a guide means comprising respective longitudinal slots 41 and 42 which extend therethrough for most of the length thereof. Posts 38 and 39 are connected together by a cross member means comprising a flat upper cross member 44 and a lower cross member 47. Upper cross member 44 is affixed in a vertical position across respective top portions 50 and 51 of posts 38 and 39 and functions as a seat stop means to support and maintain seat assembly 23 in the deployed position and functions to retain seat assembly 23 against the side of the vehicle seat while the entry seat is in the stowed position. In such stowed position, entry seat 20 allows unrestricted access to the vehicle seat such as by persons not requiring assistance entering or exiting the vehicle by means of posts 38 and 39 and seat assembly 23 being below the vertical height of the seating surface of such vehicle seat. Lower cross member 47 is affixed between posts 38 and 39 in a horizontal position. Lower cross member 47 also functions as a lower stop against which seat assembly 23 rests in the stowed position. Lower cross member 47 includes a lower vertically offset portion 53. An upstanding tab 56 extends from offset portion 53 having a hole 59 therethrough. Tab 56 fits against side portion 60 of the vehicle body 61 with hole 59 thereof aligned with a threaded hole 62 in side portion 60 to which the existing vehicle seat belt loop and hardware assembly 63 is normally bolted. Assembly 63 comprises a seat belt 64 having a lower loop portion 65 which fits through a slot 66 in a lower seat belt mounting plate 67. A seat belt retaining bolt 68 extends through a hole 69 through plate 67 with a wave washer 70 on each side thereof. A flat spacer washer 71 fits over bolt 68 against tab 56 to provide clearance for plate 67 to pivot about bolt 68, which is threaded into threaded hole 62 of side portion 60 of vehicle body 61. Such bolting of tab 56 to body 61 adds structural strength to entry seat 20, making use of the vehicle's existing seat belt mounting system. Lower cross member 47 further includes one or more clearance notches 72 which provide clearance such as for a vehicle seat tilt knob, seat belt brackets, or other such obstructions (not shown) which the particular vehicle seat and seat support brackets might have. A pair of front and rear mounting plates 73 and 74, respectively, are affixed to and extend from respective posts 38 and 39. Front mounting plate 73 can be integral with lower support member 47 as shown or as a separate piece which is affixed to the respective outside surfaces 75 and 76 of posts 38 and 39. Front mounting plate 73 is of such configuration so as to bolt to the particular bracketry which supports the vehicle seat such as front vehicle seat mounting bracket 77 holding the vehicle seat base frame (not shown) to floor portion 78 of vehicle body 61 by means of a single bolt 79 which extends through a slot 80 therethrough. Front mounting plate 73 can be designed to fit the particular vehicle and can include additional bolt holes (not shown), can be bent so as to have vertically extending holes, or whatever adaptations are needed to suit the particular vehicle including being longer so as to span and connect to both front seat mounting brackets 77 or other such bracketry and the vehicle seat base frame. An adapter bracket (not shown) can also be used which bolts or otherwise attaches to front mounting plate 73 as done with rear mounting plate 74 explained subsequently. Rear mounting plate 74 includes a pair of horizontally disposed holes 83 therethrough for attachment of rear adapter bracket 35 which bolts thereto by means of bolts 87 and nuts 89. Rear mounting plate 74 can be made to fit the particular mounting needs of the vehicle seat without such adapter bracket 35. At least one of front or rear plates 73 and 74 or a bracket such as adapter bracket 35 typically must span between the seat support bracketry on both sides of the seat at the front or rear thereof such between both of front seat support brackets 77 or between a pair of rear seat support brackets 90, so as to provide sufficient support to main frame assembly 26 during use thereof.

Rear adapter bracket 35 comprises a Z-shaped plate 92 having a horizontally extending short leg 95 and a vertically extending long leg 98 connected together by a connecting leg 101. A pair of L-shaped reinforcing brackets 104 each having a hole 107 therethrough are affixed to long leg 98 and which are bolted to rear plate 74 by means of bolts 87 and nuts 89. Short leg 95 includes a pair of slots 110 therethrough. Adapter bracket 35 as shown is of such configuration as to bolt to the right and left rear vehicle seat (mounting brackets 90 such as by means of a pair of bolts 111 which extend through slots 110. Rear adapter bracket 35 can be a separate piece as shown or can be integral with lower cross member 47. When installed in a vehicle, long leg 98 is closely adjacent floor portion 78 of vehicle body 61, such as against the vehicle floor carpeting (not shown) to provide support to adapter bracket 35 and main frame assembly 26.

Seat assembly 23 comprises a seat plate assembly 113 and a rubber pad or cushion 116. Seat plate assembly 113 includes a seat plate 119 having a straight inner edge 122, a radiused outer edge 125, and opposite side edges 128 and 131. The pivot means comprises a pair of pin portions or hinge pins 134 affixed to a lower surface 137 of seat plate 119 extend outwardly from respective side edges 128 and 131. A horizontally disposed slot 132 in post 39 allows seat assembly 23 to be assembled to and removed from main frame assembly 26. Seat plate 119 is positioned above upper cross member 44 with hinge pins 134 extending into longitudinal slots 41 of posts 38 and 39 so as to pivot about and to vertically slide therein when seat plate 119 is in a vertical position. A handle slot 140 extends adjacent outer edge 125 to aid in gripping seat assembly 23 during use and adjacent a large central hole 143. When seat plate 119 is in the generally horizontal seat position, hinge pins 134 contact ends 146 and 147 of longitudinal slots 41 and 42, and upper cross member 44 supports lower surface 137 of seat plate 119 so as to support seat plate 119 in such horizontal seat position when a load is applied to seat plate 119 such as when someone sits thereon. Such upper cross member 44 and hinge pins 134 comprise seat stop means. Rubber cushion 116 is affixed by heating to upper surface 149 of seat plate 119 and may also be affixed by other conventional means such as adhesives or riveting. Rubber cushion 116 covers upper surface 149 including central hole 143, which central hole 143 is of such size and shape as to allows rubber cushion 116 to flex thereinto and to conform to a user's posterior so as to provide further cushioning thereof. Rubber cushion 116 includes a handle slot 152 which corresponds to handle slot 140 of seat plate 119 to allow gripping of seat assembly 23 during use. Rubber cushion 116 preferably has a slick outer surface for ease of a person sliding thereacross to and from the seat of the vehicle. Cushion 116 can likewise be made of plastic or other such material which allows such sliding.

The seat stop means can further comprise support brace 29 which comprises a flat plate 155 having a first half 158 of a piano hinge 161 affixed along the top edge 164 thereof. A second half 167 of piano hinge 161 is affixed to lower surface 137 of seat plate 119. A circular cross-section lower bumper member 170 extends the length of the lower edge 173 of plate 165 to aid in preventing damage to a lower doorway portion 176 of the body 61 against which lower bumper member 170 rests for support. A support brace stop means is preferably provided to prevent support brace 152 from opening beyond a predetermined angle "A" so as to fall into the proper position by gravity when moving seat assembly 23 from the stowed position to the seat position. Such support brace stop means comprises a support brace stop assembly 177 which fits partially around piano hinge 161, including an elongate rear member 178, an elongate stop member 179, and opposing end members 180 affixed to lower surface 137 of seat plate 119. Stop assembly 177 is configured such that flat plate 155 of support brace 29 contacts the free edge 183 of stop member 179 when predetermined angle "A" is reached which angle "A" is proper to place support brace 29 against lower doorway portion 176 of vehicle body 61. The width of support brace 152 is less than the width between posts 38 so as to allow support brace 152 to fit therebetween in the stowed position. In such stowed position, brace 152 folds inwardly so as to be juxtaposed lower surface 137 of seat plate 119, with seat plate 119 and brace 152 lie inwardly of upper cross member 44 between such upper cross member 44 and the outside edge of the vehicle seat. An additional upper cross member (not shown) can be added opposite upper support member 44 to support seat plate 119 and pad 116 rather than using the outer edge of the seat.

Referring to FIGS. 6–11, therein is shown a second embodiment folding vehicle entry seat of the invention. Entry seat 186 is of adjustable width, comprising a seat means in the form of a seat assembly 189 which is pivotally attached by a pivot means to a main frame means in the form of an adjustable width main frame assembly 192 which includes a seat stop means, and the seat stop means which further includes a brace means in the form of a support brace 195.

Main frame assembly 192 comprises a main frame 198 and bolted-on front and rear adapter brackets 201 and 204. Main frame 198 includes a guide means comprising a pair of upstanding, generally rectangular cross-section tubular posts 207 and 210 having a guide means comprising respective offset longitudinal slots 213 and 216 which extend through respective inside walls 219 and 222 thereof for most of the length thereof. A plurality of tapped holes 225 extend through respective pairs of opposing sidewalls 228 and 231, and 234 and 237 of posts 207 and 210 with plastic end plugs 211 inserted therein. Posts 207 and 210 are connected together by a cross member means comprising flat upper cross members 240 which are welded to posts 207 and 210 with a fastening means comprising a plurality of tapped holes 243 therethrough, a connecting flat upper cross member 246 with the fastening means further comprising a plurality of countersunk holes 249 therethrough and a plurality of flathead bolts 252 which extend through respective holes 249 and which thread into respective tapped holes 243. The width "W" of main frame assembly 192 can be adjusted to fit the particular motor vehicle by spreading posts 207 and 210 to the needed width "W" and connecting them together by means of flathead bolts 252 inserted through the corresponding holes 249 and threaded into the respective tapped holes 243 (FIGS. 7 and 8). Upper cross members 240 and 246 function as a seat stop means to support and maintain seat assembly 189 in the deployed position and functions to retain seat assembly 189 against the side of the vehicle seat while the entry seat is in the stowed position. In such stowed position, entry seat 186 allows unrestricted access to the vehicle seat such as by persons not requiring assistance entering or exiting the vehicle by means of posts 207 and 210 and seat assembly 189 being below the vertical height of the seating surface of such vehicle seat. In this embodiment, there is typically no lower cross member to function as a lower stop against which seat assembly 189 rests in the stowed position, but rather rests against a floor portion 255 of vehicle body 258 and typically main frame assembly 192 does not connect to side portion 261 of the vehicle body 258 by means of the existing vehicle seat belt loop and hardware assembly (not shown) as was done in the first embodiment, though both could be done if so desired.

A pair of elongate front and rear mounting brackets 264 and 267 are made from respective flat metal blanks 270 which are custom modified to fit the particular motor vehicle (FIG. 9). Blanks 270 comprise an elongate body 273 and an integral mounting tab 276. Body 273 includes a plurality of pairs of V-shaped clearance notches 2;6 and 279 connected by respective bend lines 282 which are disposed at about a forty-five degree angle to a longitudinal centerline 284 of blank 270, a long clearance indent 285, and a short clearance indent 288 which indents 285 and 288 provide clearance such as for a fuel door or trunk release, or other such obstructions (not shown) which the particular motor vehicle might have. Mounting tab 276 includes a pair of mounting slots 291 and a bend line 294 also disposed at about a forty-five degree angle to longitudinal centerline 284. Mounting tab 276 is bent downwardly about forty-five degrees along bend line 294 to form front mounting bracket 264 and is bent upwardly about forty-five degrees from the plane of body 273 along bend line 294 to form rear mounting bracket 267.

Front and rear mounting brackets 264 and 267 bolt to respective posts 207 and 210 by means of a plurality of hexagonal head bolts 297 which extend through respective mounting slots 291 of mounting tabs 276 and into tapped holes 225 of sidewalls 228 or 231 and 234 or 237 of posts 207 and 210 as required to fit the particular motor vehicle. Front and rear mounting brackets 264 and 267 are custom modified to fit the particular motor vehicle by bending, such as by using a metal break or bench mounted vice, and cutting to length. Firstly, the bend angle of mounting tab 276 along bend line 294 is adjusted, such as to form a right angle with main frame assembly 192 or whatever angle is needed to fit the particular motor vehicle. Next, a ninety degree bend is made along one of bend lines 282 connecting a pair of clearance notches 276 and 279 in the same direction as mounting tab 276 so as to position a horizontal lower portion 300 bent inwardly and juxtaposed floor portion 78. Finally, lower portion 300 is cut to length as required such as at cut line 303 and a pair of mounting holes 306 drilled therethrough for bolting to floor portion 78.

Alternatively, one or both of front and rear mounting brackets 264 and 267 can be bolted to the particular bracketry which supports the vehicle seat such as front vehicle seat mounting bracket 309 or rear seat support brackets 312 holding the vehicle seat base frame (not shown) to floor portion 255 of vehicle body 258 by means of a custom bracket (not shown) bolted to front or rear mounting bracket 264 or 267 and to vehicle seat mounting bracket 309 or 312. Such mounting might require one or both of front and rear mounting brackets 264 and 267 to be redesigned such as lengthening or shortening, changing the bend angles to other than forty-five degrees, etc., to fit the particular motor vehicle. Likewise, front and rear mounting brackets 264 and 267 can include additional bolt holes (not shown), can be bent so as to have vertically extending holes, or whatever adaptations are needed to suit the particular vehicle. Unlike the first embodiment entry seat 20, the second embodiment entry seat 186 typically does not require one of front or rear mounting brackets 264 and 267 to span between front or rear seat support brackets 309 or 312 since main frame 198 includes posts 207 and 210 which directly contact floor portion 78 and front and rear mounting brackets 264 and 267 are at an angle and anchored to floor portion 78 so as to provide sufficient support to main frame assembly 192 during use thereof without spanning between both front vehicle or rear seat mounting brackets 309 or 312.

Seat assembly 189 comprises a seat 315, a pivot means comprising an elongate seat pivot rod 318, and a seat retaining means comprising pair of set screw collars 321.

Seat 315 includes a molded plastic inverted shell 324 and an elongate molded plastic seat insert 327. Shell 324 is formed from a piece of plastic which is heated and formed around a mold so as to have an upper surface 330, a hollowed bottom chamber 333, a straight inner edge surface 336, a semi-radiused outer edge surface 339, and straight side edge surfaces 342 and 345. An elongate main pivot hole 348 extends through side edge surfaces 342 and 345, and longitudinally through seat insert 327 to receive seat pivot rod 318 with collars 321 positioned and tightened closely adjacent respective side edge surfaces 342 and 345 to retain seat 315 in the desired position relative to seat pivot rod 318 with respective ends 351 and 354 thereof extending outwardly from respective side edge surfaces 342 and 345 of seat 315. Seat 315 can be positioned along the length of pivot rod 318 as desired and retained in such position by set screw collars 321. Entry seat 186 can be used on the front driver's side of the vehicle as shown in FIG. 6, or on the front passenger side of the vehicle (not shown), typically being positioned toward the front end of the vehicle. Seat 315 is positioned above upper cross members 240 and 246 with ends 351 and 354 of seat pivot rod 318 extending into longitudinal slots 213 and 216 of posts 207 and 210 so as to pivot about and to vertically slide therein when seat 315 is in a vertical position. Ends 351 and 354 of seat pivot rod 318 can be inserted into respective longitudinal slots 213 and 216 of posts 207 and 210 by means of tilting seat 315 with seat pivot rod 318 diagonally therebetween and then bringing seat 315 with seat pivot rod 318 back to the horizontal position with ends 351 and 354 of seat pivot rod 318 disposed within respective slots 213 and 216. A horizontally disposed slot (not shown) can be formed in one of posts 207 and 210 which allows seat assembly 189 to be assembled to and removed from main frame assembly 192 in a similar manner to seat assembly 23 of first embodiment entry seat 20. When seat 315 is in the generally horizontal seat position, ends 351 and 354 of seat pivot rod 318 contact ends 360 and 363 of longitudinal slots 213 and 216, and upper cross members 240 and 246 support a lower surface 366 of seat insert 327 so as to support seat 315 in such horizontal seat position when a load is applied to seat 315 such as when someone sits thereon. Upper cross members 240 and 246, and the fastening means comprising tapped holes 243 through flat upper cross members 240, countersunk holes 249 through flat upper cross member 246, and flathead bolts 252 which extend through respective holes 249 and which thread into respective tapped holes 243 comprise seat stop means. A rubber cushion (not shown) or other such pad can be affixed to seat 315 such as by means of adhesives or riveting. Such cushion preferably has a slick outer surface for ease of a person sliding thereacross to and from the seat of the vehicle such as being made of plastic or other such material.

The seat stop means can further comprise a support brace 369 which comprises a plastic brace plate 372, a brace pivot rod 375, and a brace plate retaining means comprising a pair of external snap rings 378. Brace plate 372 includes a longitudinal hole 381 through a straight upper portion 384 thereof, a semi-rounded lower edge 387, and respective side edges 390 and 393 so as to be of a configuration to fit within chamber 333 of seat 315 allowing space between semi-rounded lower edge 387 and adjacent outer edge surface 339 of seat 315 for an inside finger gripping area 396 of seat assembly 189 to aid in gripping seat 315 during use. Brace pivot rod 375 extends through longitudinal hole 381 of seat 315 and through respective holes 399 and 402 of outer edge surface 339 of shell 324 to pivot thereon. The brace plate retaining means further comprises respective annular grooves 405 and 408 disposed at respective ends 411 and 414 of brace pivot rod 375 adjacent respective side edges 390 and 393 of brace plate 372. Brace plate 372 can include a circular cross-section lower bumper member (not shown) which extends along lower edge 387 of brace plate 372 to aid in preventing damage to a lower doorway portion 417 of vehicle body 258 against which lower edge 387 rests for support.

A support brace stop means is preferably provided to prevent brace plate 372 from opening beyond a predetermined angle "B" so as to fall into the proper position by gravity when moving seat assembly 139 from the stowed position to the seat position. Such support brace stop means comprises a support brace strap assembly 420 comprising a flexible strap 423 having first and second end portions 426 and 429, and a mounting means comprising a single hole 432 through first end portion 426, a plurality of holes 435 through second end portion 429, and a pair of rivets 438 which extend respectively through hole 432 and a hole 441 in brace plate 372 and through one of holes 435 and a hole 444 in shell 324 of seat 315. Holes 435 allow the effective length of strap 423 to be adjusted such that the effective length of strap 423 is fully extended between brace plate 372 and shell 324 of seat 315 when predetermined angle "B" is reached which angle "B" is proper to place lower edge 387 of brace plate 372 against doorway portion 417 of vehicle body 258. The width of brace plate 372 is less than the width between posts 207 and 210 when width "W" is at the narrowest position so as to allow brace plate 372 to fit therebetween in the stowed position. In such stowed position, brace plate 372 folds inwardly to fit within chamber 333 of shell 324, with seat 315 and brace plate 372 which lie inwardly of upper cross members 240 and 246 between such upper cross members 240 and 246 and the outside edge of the vehicle seat. An additional upper cross member or members (not shown) can be added opposite upper cross members 240 and 246 to support seat 315 rather than using the outer edge of the seat.

Many variations of the transfer seat of the invention are possible while staying within the inventive concept thereof. For example, the upright posts can be eliminated and the guide means thereof added to the front and rear plates in the form of vertical slots in which the pins of the seat assembly can slide. Many or all of the individual component parts of the main frame assembly can be combined together in one or more pieces of bent, stamped, or otherwise formed sheet metal. The rubber cushion can be made thicker or out of other materials such as a foam filled cloth cover. The support brace can comprise a folding, locking arm such as used on step ladders and extension leafs of dining tables. Likewise, the transfer seat can be designed to attach to any existing bracketry, bolting locations, or other such support points which ultimately (i.e. directly or through bracketry or other such mountings) firmly connect the entry seat to the vehicle body, frame, floor, or other such structure to which the vehicle seats are originally ultimately firmly connected to. While utilizing existing bolts and bolting locations is preferred, special bolts such as of a longer or shorter length, or of other desired configuration can be used. Likewise, the transfer seat can be secured using other such conventional means which may make sense for the particular vehicle configuration such as on future vehicle models which may not utilize bolts but which may have other such existing means to mount the transfer seat without modifications to the vehicle. However, minor modifications of the vehicle are also contemplated within the inventive concept such as drilling and tapping holes in the vehicle body, brackets, or other such structure for mounting of the transfer seat, particularly where the existing bolts and bolting locations do not readily lend themselves to mounting of the transfer seat. The use of plastics and metal reinforced plastics is likewise contemplated within the inventive concept. The posts can be bolted or otherwise attached directly to the body or floor of the vehicle without using any attachment plates or adapter brackets, such as for use in mini-vans and other vehicles which have a body or floor which includes a longitudinally extending vertical face beside the vehicle seat to bolt the posts to. The guide means can comprise square slide rings which slide externally of the posts and to which the seat is pivotally connected, or other such device. The main frame can be made extendible using telescoping tubes which pin, bolt, or otherwise lock together at the desired length.

Whereas this invention is here illustrated and described with reference to embodiments thereof presently contemplated as the best mode of carrying out such invention in actual practice, it is to be understood that vaiious changes may be made in adapting the invention to different embodiments without departing from the broader inventive concepts disclosed herein and comprehended by the claims that follow.

I claim:

1. A folding motor vehicle entry seat for persons who use wheelchairs and others who have physical limitations, which vehicle entry seat attaches to the body of the vehicle such as by utilizing existing vehicle connecting means used to mount a seat of the vehicle to the body of the vehicle and/or to the floor of the body of the vehicle, which vehicle entry seat mounts adjacent to the vehicle seat above the lower doorway portion of the vehicle body, comprising:

a main frame means which extends generally adjacent to the vehicle seat, which main frame means attaches to the body of the vehicle, and which includes a seat stop means attached thereto;

a seat means which is pivotally connected to said main frame means at an inside edge portion of said seat means generally adjacent the vehicle seat, said seat means having a deployed position with the vehicle door open extending generally horizontally, laterally of the vehicle over the lower doorway portion of the vehicle body, wherein said seat stop means contacts and retains said seat means in such deployed position, and wherein said seat means includes a stowed position wherein said seat means pivots to a generally vertical position adjacent the vehicle seat allowing the vehicle door to close; and wherein said main frame means includes a guide means such that said inside edge portion of said seat means moves from the stowed position vertically upwardly along said guide means to the deployed position wherein said seat stop means vertically retains said seat means in said deployed position, and wherein to return said seat to the stowed position said seat means is moved to a generally vertical position and said seat means is moved vertically downwardly along said guide means to the stowed position so as to fit in such stowed position adjacent the vehicle seat, and wherein said seat means comprises a seat assembly having a seat and a pivot means for pivotally slidably connecting said inside edge portion of said seat to said guide means.

2. A motor vehicle entry seat according to claim 1, wherein the main frame means includes a pair of upstanding post means connected together in a spaced relationship by a cross member means.

3. A motor vehicle entry seat according to claim 2, wherein the post means each comprise a post of generally rectangular cross-section.

4. A motor vehicle entry seat according to claim 2, wherein the post means each comprise a tubular post.

5. A motor vehicle entry seat according to claim 4, wherein the tubular posts are each of generally rectangular cross-section.

6. A motor vehicle entry seat according to claim 2, wherein the guide means comprises a vertically extending slot in each post means, and the pivot means comprises respective pin portions which are connected to and which extend from opposite sides of the seat.

7. A folding motor vehicle entry seat for persons who use wheelchairs and others who have physical limitations, which vehicle entry seat attaches to the body of the vehicle such as by utilizing existing vehicle connecting means used to mount a seat of the vehicle to the body of the vehicle and/or to the floor of the body of the vehicle, which vehicle entry seat mounts adjacent to the vehicle seat above the lower doorway portion of the vehicle body, comprising:

a main frame means which extends generally adjacent to the vehicle seat, which main frame means attaches to the body of the vehicle, and which includes a seat stop means attached thereto;

a seat means which is pivotally connected to said main frame means at an inside edge portion of said seat means generally adjacent the vehicle seat, said seat means having a deployed position with the vehicle door open extending generally horizontally, laterally of the vehicle over the lower doorway portion of the vehicle body, wherein said seat stop means contacts and retains said seat means in such deployed position, and wherein said seat means includes a stowed position wherein said seat means pivots to a generally vertical position adjacent the vehicle seat allowing the vehicle door to close; and wherein said main frame means includes a guide means such that said inside edge portion of said seat means moves from the stowed position vertically upwardly along said guide means to the deployed position wherein said seat stop means vertically retains said seat means in the deployed position and wherein to return said seat to the stowed position said seat means is moved to a generally vertical position and said seat means is moved vertically downwardly along said guide means to the stowed position so as to fit in such stowed position adjacent the vehicle seat, and wherein said main frame means includes respective front and rear adapter brackets attached thereto which extend laterally inwardly of the vehicle at respective front and rear ends of such main frame means so as to connect to the body of the vehicle.

8. A motor vehicle entry seat according to claim 7, wherein the front and rear adapter brackets include respective upper and lower ends, said upper ends which are removably attachable to the main frame means using a bolt means which extends through respective holes in said main frame means and said lower ends which are attachable to the body of the vehicle.

9. A motor vehicle entry seat according to claim 8, wherein at least one of the holes in the frame means is part of a plurality of holes which extends vertically thereon for selective attachment of at least one of the front and rear adapter brackets at a plurality of vertical positions thereon to fit the particular vehicle.

10. A motor vehicle entry seat according to claim 8, wherein the lower portion of at least one adapter bracket includes respective pairs of generally V-shaped notches at opposite edges thereof interconnected by respective bend lines disposed at an angle to the longitudinal centerline of said adapter bracket, such that the height at which said adapter bracket mounts to the respective post is configurable to the particular motor vehicle by attaching the respective adapter bracket to the respective post at the desired vertical position for the particular motor vehicle and bending the respective lower portion along the respective bend line for proper attachment to the floor of the vehicle.

11. A folding motor vehicle entry seat for persons who use wheelchairs and others who have physical limitations, which vehicle entry seat attaches to the body of the vehicle such as by utilizing existing vehicle connecting means used to mount a seat of the vehicle to the body of the vehicle and/or to the floor of the body of the vehicle, which vehicle entry seat mounts adjacent to the vehicle seat above the lower doorway portion of the vehicle body, comprising:

a main frame means which extends generally adjacent to the vehicle seat, which main frame means attaches to the body of the vehicle by extending laterally inwardly of the vehicle at respective front and rear ends of such mainframe to attach to the connecting means, and which includes a seat stop means attached thereto;

a seat means which is pivotally connected to said main frame means at an inside edge portion of said seat means generally adjacent the vehicle seat, said seat means comprising a seat assembly having a seat and a pivot means for pivotally slidably connecting said inside edge portion of said seat to the guide means, said seat having a deployed position extending generally horizontally, laterally of the vehicle with the vehicle door open over the lower doorway portion of the vehicle chassis, wherein said seat stop means contacts and retains said seat means in such deployed position, and wherein said seat means includes a stowed position wherein said seat means pivots to a generally vertical position adjacent the vehicle seat allowing the vehicle door to close; and wherein said main frame means includes a guide means such that said inside edge portion of said seat moves from the stowed position vertically upwardly along said guide means to the deployed position wherein said seat stop means vertically retains said seat in the deployed position and wherein to return said seat to the stowed position said seat is moved to a generally vertical position and said seat is moved vertically downwardly along said guide means to the stowed position so as to fit in such stowed position adjacent the vehicle seat, and wherein said seat stop means includes a brace means which extends between said seat and the lower doorway portion of the vehicle body in the deployed position to further support said seat in such deployed position and which brace means pivots to a position generally adjacent to and parallel to said seat in the stowed position of said seat, said brace means comprising a brace member which is pivotally connected to said seat generally parallel to and toward an outside edge thereof, said brace means including a brace stop means which comprises a flexible strap which connects said brace member to said seat which prohibits said brace member from moving beyond a predetermined included angle between said seat and said brace member at which said brace means correctly contacts the lower doorway portion of the vehicle body.

12. A motor vehicle entry seat according to claim 11, wherein the strap is adjustably connected to one of the brace member and the seat to permit adjustment of the included angle therebetween to fit the particular motor vehicle.

13. A folding motor vehicle entry seat for persons who use wheelchairs and others who have physical limitations, which vehicle entry seat attaches to the body of the vehicle such as by utilizing existing vehicle connecting means used to mount a seat of the vehicle to the body of the vehicle and/or to the floor of the body of the vehicle, which vehicle entry seat mounts adjacent to the vehicle seat above the lower doorway portion of the vehicle body, comprising:

a main frame means which extends generally adjacent to the vehicle seat, which main frame means attaches to the body of the vehicle, and which includes a seat stop means attached thereto, said main frame means being of adjustable width; and a seat means which is pivotally connected to said main frame means at an inside edge portion of said seat means generally adjacent the vehicle seat, said seat means having a deployed position with the vehicle door open extending generally horizontally, laterally of the vehicle over the lower doorway portion of the vehicle body, wherein said seat stop means contacts and retains said seat means in such deployed position, and wherein said seat means includes a stowed position wherein said seat means pivots to a generally vertical position adjacent the vehicle seat allowing the vehicle door to close.

14. A motor vehicle entry seat according to claim 13, wherein the main frame means includes a guide means such that the inside edge portion of the seat means moves from the stowed position vertically upwardly along said guide means to the deployed position wherein the seat stop means vertically retains said seat means in said deployed position and wherein to return said seat to the stowed position said seat means is moved to a generally vertical position and said seat means is moved vertically downwardly along said guide means to the stowed position so as to fit in such stowed position adjacent the vehicle seat.

15. A motor vehicle entry seat according to claim 14, wherein the seat means comprises a seat assembly having a seat and a pivot means for pivotally slidably connecting an inside edge portion of said seat to the guide means, said seat being pivotable about and slidably positionable along said guide means and retainable in a desired position using a seat retaining means.

16. A motor vehicle entry seat according to claim 15, wherein the pivot means comprises an elongate pivot rod having respective opposite ends which extend from opposite sides of the seat, the guide means comprises respective vertically extending slots in the main frame means in which said opposite ends vertically slide, and the retaining means comprises a pair of retaining collars which slidably engage said pivot rod at opposite sides of said seat and which are lockable on said pivot rod to longitudinally retain said seat on said pivot rod.

17. A motor vehicle entry seat according to claim 16, wherein the retaining collars include respective set screws which are screwably tightenable against the pivot rod to lock thereagainst.

18. A motor vehicle entry seat according to claim 15, wherein the main frame means includes a pair of upstanding post means connected together in a spaced relationship by an adjustable width cross member means.

19. A motor vehicle entry seat according to claim 18, wherein the adjustable width cross member means comprises a pair of end cross members affixed to the respective post means and which are adjustably interconnected by a connecting means.

20. A motor vehicle entry seat according to claim 19, wherein the end cross members are adjustably interconnected by means of having a plurality of longitudinal holes and the connecting means comprises a plurality of bolt means.

21. A motor vehicle entry seat according to claim 19, wherein the end cross members adjustably interconnect by means of a center cross member having a plurality of longitudinal holes and the bolt means.

22. A motor vehicle entry seat according to claim 21, wherein the end cross members are adjustably interconnected by means of having a plurality of longitudinal holes and the connecting means comprises a plurality of bolt means.

23. A motor vehicle entry seat according to claim 22, wherein the holes in one of the pair of end cross members and the center cross member are tapped and the other clearance holes, and the bolt means comprise bolts which extend through respective clearance holes and threadably engage respective threaded holes to secure the respective end cross member to said center cross member.

* * * * *